United States Patent [19]

Tonami

[11] Patent Number: 5,432,564
[45] Date of Patent: Jul. 11, 1995

[54] DIGITAL CHROMINANCE SIGNAL PROCESSING CIRCUIT FOR CONVERTING BETWEEN HIGH-BAND CONVERTED CHROMINANCE SIGNALS, LOW-BAND CONVERTED CHROMINANCE SIGNALS, AND COLOR DIFFERENCE SIGNALS

[75] Inventor: Junichiro Tonami, Yokohama, Japan

[73] Assignee: Victor Company Of Japan, Ltd., Yokohama, Japan

[21] Appl. No.: 267,356

[22] Filed: Jun. 29, 1994

[30] Foreign Application Priority Data

Jun. 29, 1993 [JP] Japan ................................ 5-184504

[51] Int. Cl.⁶ ........................................ H04N 9/64
[52] U.S. Cl. ........................................ 348/646; 348/651
[58] Field of Search ................. 348/654, 646, 651; 358/316; H04N 9/64

[56] References Cited

U.S. PATENT DOCUMENTS

| | | | |
|---|---|---|---|
| 4,523,221 | 6/1985 | Chin et al. | 348/651 |
| 4,673,970 | 6/1987 | Matsumoto et al. | 348/646 |
| 4,695,875 | 9/1987 | Kishi | 348/654 X |
| 5,130,787 | 7/1992 | Ozaki et al. | |
| 5,185,657 | 2/1993 | Ozaki et al. | |

OTHER PUBLICATIONS

IEEE Transaction Consumer Electronics, vol. CE-31, No. 3, pp. 374-377, Aug. 1985, Mehrgardt (ITT).
IEEE Transaction Consumer Electronics, vol. 36, No. 3, pp. 560-566, Aug. 1990, Matsumoto et al, (Matsushita Electronics Co., Ltd.).

*Primary Examiner*—Victor R. Kostak
*Attorney, Agent, or Firm*—Jacobson, Price, Holman & Stern

[57] ABSTRACT

A reproducing circuit converts a low-band converted chrominance signal into digital signals for reproducing processing and outputs a high-band converted chrominance signal. In this reproducing circuit, the digitalized low-band chrominance signal is separated to phase data and amplitude data. The phase data is decoded, and the frequency and phase fluctuations thereof are corrected. The corrected phase data is encoded to generate a continuous wave. The generated continuous wave is multiplied by the amplitude data to obtain the high-band converted chrominance signal. Similarly, a recording circuit converts a high-band converted chrominance signal into digital signals for recording processing and outputs a low-band converted chrominance signal. In this recording circuit, the digitalized high-band chrominance signal is separated to phase data and amplitude data. The phase data is decoded, and the frequency and phase fluctuations thereof are corrected. The corrected phase data is encoded, and the frequency thereof is controlled to a predetermined frequency to generate a continuous wave. The generated continuous wave is multiplied by the amplitude data to obtain the low-band converted chrominance signal.

17 Claims, 13 Drawing Sheets

DIGITAL CHROMINANCE SIGNAL PROCESSING CIRCUIT FOR CONVERTING BETWEEN HIGH-BAND CONVERTED CHROMINANCE SIGNALS, LOW-BAND CONVERTED CHROMINANCE SIGNALS, AND COLOR DIFFERENCE SIGNALS

BACKGROUND OF THE INVENTION

1. Field of the Invention

The present invention relates to an improvement of a digital chrominance signal processing circuit for a VTR for recording and reproducing chrominance signals included in video signals on the basis of low-band conversion thereof.

2. Description of the Prior Art

FIG. 1 shows an example of a prior art digital chrominance signal processing circuit, which has been disclosed in Proceedings of Television Institute, VOL. 15, No. 36, pp. 1 to 6. In FIG. 1, a dc-cutting circuit 100, a comb filter 108, a feed-forward APC (automatic phase control) circuit 114, and another comb filter 118 are used for reproducing video signals. On the other hand, an AFC (automatic frequency control) circuit 130 and a multiplier 132 are used for recording the video signals. Further, the remaining circuits other than those described above are used in common for recording and reproducing the video signals.

The chrominance signal reproducing operation will be first described hereinbelow. The dc components of the low-band converted chrominance signal data read from a video tape, for instance are cut off by the dc-cutting circuit 100, and then supplied to a multiplier 102. To this multiplier 102, a carrier signal is inputted from a carrier signal generator 112 controlled by a CPU 110. Therefore, an APC loop can be formed by these circuits 110 and 112 to execute a synchronous detection of the low-band converted carrier chrominance signal.

After that, the chrominance signal data are supplied to a decimation LPF 104 to eliminate unnecessary components and thin-out (extract) the data at a ratio of 1/6. The data outputted by the decimation LPF 104 are supplied to an ACC (automatic chroma level control) loop formed by a multiplier 106 and the CPU 110 to execute a burst ACC processing, so that the amplitude of the burst signal can be controlled to remain constant at all times.

Further, the processed data are supplied to the comb filter 108 to eliminate the crosstalk. The crosstalk, for example, arises in the chrominance signal between adjacent tracks of a video tape, the signal recorded thereon by the helical scanning system. The processed data are then supplied to the feed-forward APC circuit 114 to correct the residual phase error. The processed data are supplied to the comb filter 118 to improve the S/N ratio. Thereafter, the data are further processed through an additional function circuit 122 and an interpolation LPF 124, and then supplied to a multiplier 128 to multiply the data by a carrier signal outputted by a carrier generator 128, that is, to modulate the data to a carrier chrominance signal for reproduction of the chrominance signal.

The chrominance signal recording operation will be described hereinbelow. The high-band chrominance signal is inputted to a multiplier 102 via the dc-cutting circuit 100. This multiplier 102 executes the synchronous detection of the carrier chrominance signal through the APC loop formed by the CPU 110 and the carrier generator 112.

The data outputted by the multiplier 102 are supplied to the decimation LPF 104 to eliminate unnecessary components and thin-out (extract) the data at a ratio of 1/2. The data outputted by the decimation LPF 104 are supplied to the ACC loop formed by the multiplier 106 and the CPU 110 to execute a burst ACC processing and a chroma ACC processing, so that the peak level of chrominance signal can be controlled constant at all times. The processed data are supplied to the additional function circuit 122 via a switch 120 for CNR (chroma noise reduction) processing.

The data thus processed are supplied to the interpolation LPF 124 for data interpolation. The interpolated data are supplied to the multiplier 132. The multiplier 132 and the AFC circuit 130 are used to modulate the color difference signal to the low-band converted chrominance signal, and generate a carrier in synchronism with a horizontal synchronizing signal. As described above, it is possible to obtain the low-band converted chrominance signal data.

The above-mentioned prior art digital chrominance signal processing circuit is provided with the following features:

(1) The video signal can be processed after having been converted into the color difference signal.

(2) The ACC and APC can be processed in time serial manner under control of software management by the CPU.

(3) The feed-forward type APC can be adopted to improve the monochromatic S/N ratio against PM noise.

(4) After the processing by the multiplier 102 for synchronous detection, the clock frequency can be lowered to reduce the number of elements (such as delay circuits) during one horizontal scanning period (1H).

(5) The carrier generator 112 can be controlled by the CPU 110.

However, the prior art digital chrominance signal processing circuit involves the following drawbacks:

(1) Since the multipliers 102, 108, 128 and 132 are used, the number of gates (i.e., the number of elements) is large. In addition, since the PLL control is executed by integrating the phase difference information in the feedback APC with the use of the CPU 110 and the carrier generator 112, the number of data bits increases. Further, since a feed-forward APC circuit is incorporated in addition to the feedback APC control, and further since two control circuits are provided for both the APC circuits separately, the element construction is not effective. Further, since the two carrier generators 112 and 128 are provided for generating the sine wave signals used as frequency converting local carriers, some integrators and sine ROMs are required for each carrier generator respectively, thus increasing the circuit scale.

(2) In the case where hue varies, the circuit construction scale cannot be reduced (e.g., bit information cannot be reduced), because the S/N ratio deteriorates and consequently the resolution degrades.

(3) In comparison with the cost of the analog processing integrated circuits now on the market, the prior art circuit is very costly, so that it is impossible to adopt it for public use.

SUMMARY OF THE INVENTION

With these problems in mind, therefore, it is the object of the present invention to provide a digital chrominance signal processing circuit, which can control hue and color density (strength) simply, in spite of a small scale circuit configuration, that is, with fewer circuit elements.

To achieve the above-mentioned object, the present invention provides a digital chrominance signal processing circuit for converting a low-band converted chrominance signal into digital signals for reproducing processing and outputting a high-band converted chrominance signal, which comprises: separating means for separating digitized chrominance signal into phase data and amplitude data; decoding means for decoding the phase data; correcting means for correcting fluctuations in frequency and in phase of the decoded phase data; encoding means for encoding the fluctuation-corrected phase data; continuous wave generating means for generating a continuous wave on the basis of the encoded phase data; and multiplying means for multiplying the generated continuous wave by amplitude data to obtain high-band converted chrominance signal.

Further, the present invention provides a digital chrominance signal processing circuit for converting a high-band converted chrominance signal into digital signals for recording processing and outputting a low-band converted chrominance signal, which comprises: separating means for separating digitized chrominance signal into phase data and amplitude data; decoding means for decoding the phase data; correcting means for correcting fluctuations in frequency and in phase of the decoded phase data; encoding means for encoding the fluctuation-corrected phase data; control means for controlling the frequency of the encoded phase data to a predetermined frequency; continuous wave generating means for generating a continuous wave on the basis of the frequency-controlled phase data; and multiplying means for multiplying the generated continuous wave by amplitude data to obtain a low-band converted chrominance signal.

Further, the present invention provides a digital chrominance signal processing circuit for converting a low-band converted chrominance signal into digital signals for reproducing processing and outputting two color difference signals whose phase are shifted by 90 degrees from each other, which comprises: separating means for separating digitized chrominance signal into phase data and amplitude data; decoding means for decoding the phase data; correcting means for correcting fluctuations in frequency and in phase of the decoded phase data; first continuous wave generating means for generating a first continuous wave on the basis of the corrected phase data; phase shifting means for shifting the phase of the corrected phase data by 90 degrees; second continuous wave generating means for generating a second continuous wave on the basis of the phase-shifted phase data; and multiplying means for multiplying the two generated continuous waves generated by said first and second continuous wave generating means by amplitude data, respectively to obtain two color difference signals.

Further, the separating means comprises detecting means for detecting the phase data by obtaining two orthogonal components of the digitized chrominance signal and by dividing the smaller component thereof by the larger component thereof.

Further, the decoding means comprises outputting means for adding or subtracting a constant corresponding to the low-band converted frequency to or from the phase data and outputting the decoded phase data.

Further, the decoding means comprises outputting means for adding or subtracting a constant corresponding to the high-band converted frequency to or from the phase data and outputting the decoded phase data.

Further, the correcting means comprises: first detecting means for detecting a burst portion of the decoded phase data; second detecting means for detecting frequency fluctuations of the burst portion; first outputting means for outputting a correction rate corresponding to the detected frequency fluctuations; and second outputting means for adding or subtracting the outputted correction rate to or from the decoded phase data and outputting the frequency-corrected phase data.

Further, the correcting means comprises: detecting means for detecting a burst phase of the frequency-corrected phase data; and third outputting means for correcting phase fluctuations of the frequency-corrected phase data in such a way that the detected phase becomes zero for each horizontal scanning period, and outputting the frequency-corrected phase data.

Further, in the digital chrominance signal processing circuit for reproducing processing, the encoding means comprises outputting means for adding or subtracting a constant corresponding to the high-band converted frequency to or from the fluctuation-corrected phase data and outputting the encoded phase data.

Further, in the digital chrominance signal processing circuit for recording processing, the encoding means comprises outputting means for adding or subtracting a constant corresponding to the low-band converted frequency to or from the fluctuation-corrected phase data and outputting the encoded phase data.

Further, in the digital chrominance signal processing circuit for recording processing, the frequency control means comprises: detecting means for detecting a constant phase corresponding to the low-band converted frequency on the basis of a horizontal synchronizing signal; and outputting means for adding or subtracting the detected phase data to or from the encoded phase data and outputting the phase data whose frequency is controlled to a predetermined frequency.

DETAILED DESCRIPTION OF THE PREFERRED EMBODIMENTS

An embodiment of the digital chrominance signal processing circuit according to the present invention will be described hereinbelow with reference to the attached drawings.

Figure 2:
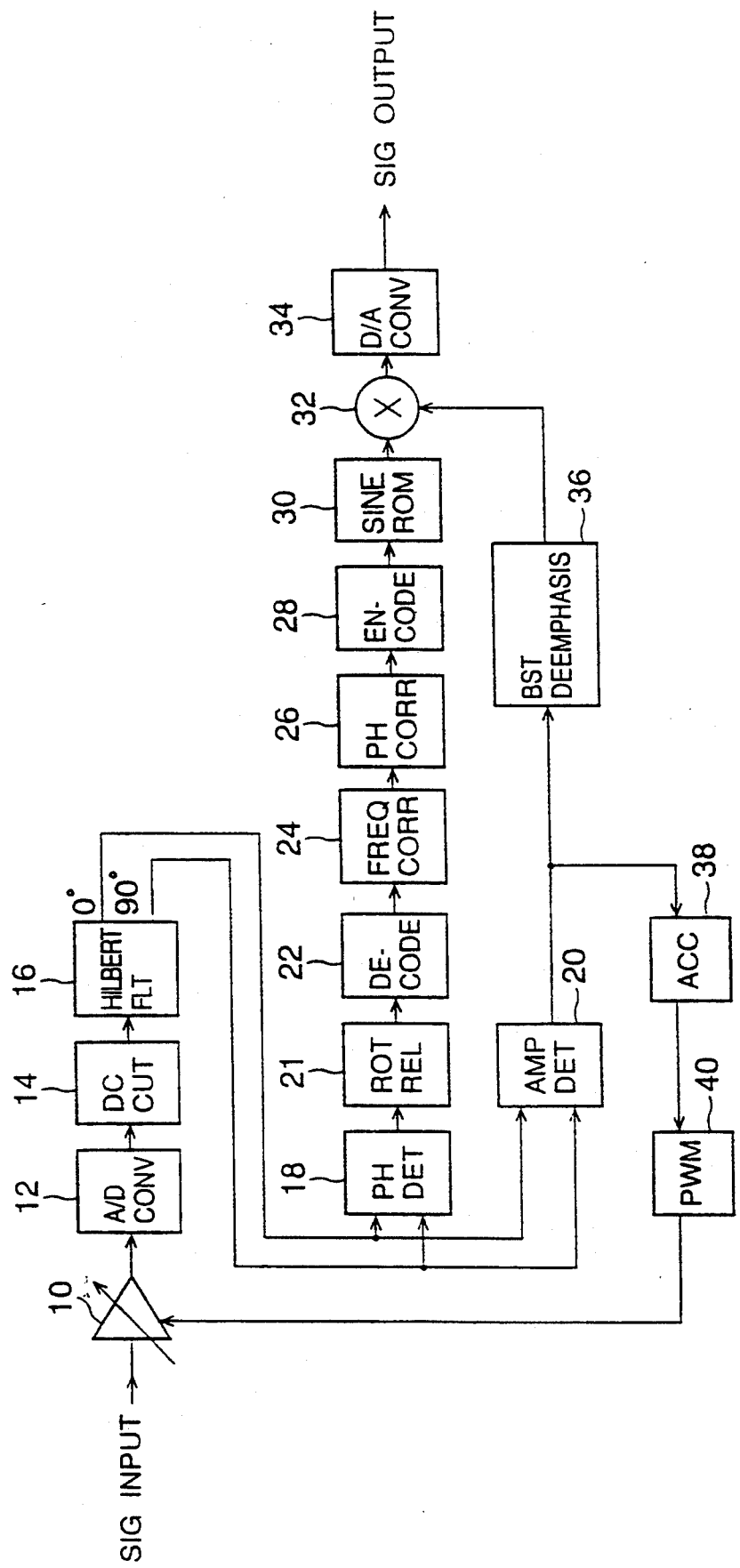
FIG. 2 is a block diagram showing an embodiment of the digital chrominance signal reproducing circuit according to the present invention.

FIG. 2 shows an entire circuit configuration of a reproducing circuit of the processing circuit according to the present invention. In FIG. 2, the low-band converted chrominance signal read out of a recording medium such as a video tape is inputted to a variable amplifier 10. The output side of this variable amplifier 10 is connected to an input side of a Hilbert filter 16 via an A/D converter 12 and a dc-cutting circuit 14, respectively. Further, the respective 0- and 90-degree component output sides of the Hilbert filter 16 are connected to a phase detecting circuit 18 and an amplitude detecting circuit 20, respectively.

Further, the output side of the phase detecting circuit 18 is connected to a ROT (rotation) releasing circuit 21. The output side of this ROT releasing circuit 21 is connected to a decode circuit 22. The output of the decode circuit 22 is connected to a frequency correcting circuit 24; and the output of this frequency correcting circuit 24 is connected to a phase correcting circuit 26. Further, the output side of this circuit 26 is connected to an encode circuit 28; the output side of this circuit 28 is connected to a sine ROM 30; the output side of this sine ROM 30 is connected to one input side of a multiplier 32; and the output side of this multiplier 32 is connected to a D/A converter 34.

On the other hand, the output side of the amplitude detecting circuit 20 is connected to a burst de-emphasis circuit 36, and the output side of this circuit 36 is connected to the other input side of the multiplier 32. In addition, the output side of the amplitude detecting circuit 20 is connected to an ACC (automatic chroma level control) circuit 38. The output side of this circuit 38 is connected to a PWM circuit 40. Further, the output side of this PWM (pulse width modulating) circuit 40 is connected to a control side of the variable amplifier 10.

In the above-mentioned circuit configuration, the variable amplifier 10, the ACC circuit 38 and the PWM circuit 40 form an ACC loop, so that the low-band converted chrominance signal can be controlled at a constant level. Since the low-band converted chrominance signal is controlled as a pulse width modulated signal by the PWM circuit 40, it is possible to simplify the construction of the A/D converter 12. Accordingly, since the LPF (low pass filter) can be composed of a resistor and a capacitor, for instance, this circuit construction is convenient for the A/D conversion processing.

The Hilbert filter 16 is a circuit for shifting the phase of the input signal by 90 degrees throughout the frequency band thereof, so that it is possible to obtain two orthogonal components of the input signal. Since this circuit 16 is basically of feed-forward circuit, it is possible to obtain the two orthogonal components without using any multiplier.

The phase detecting circuit 18 and the amplitude detecting circuit 20 are the circuits for detecting the phase component and the amplitude component, separately from the two signals shifted 90 degrees out of phase with respect to each other through the Hilbert filter 18. Since the detected amplitude and phase both fluctuate due to noise, the input signal $\Phi_1(t)$ can be expressed under consideration of the frequency fluctuations as follows:

$$\Phi_1(t) = \qquad \text{[formula 1]}$$

$$A(t)\cos\left(\omega_{629k} \cdot t + M \cdot X(t) + D\omega \int_0^t Y(t)dt + Z(t) + \theta_0 \right)$$

where
A(t): amplitude modulated signal
X(t): phase modulated signal
Y(t): frequency modulated signal
Z(t): jitter component
$\omega_{629k}$: low-band converted signal angular frequency
M: modulation index
$D_\omega$: modulation index (dependent upon frequency)
$\theta_0$: initial phase Further, the noise component superimposed upon the amplitude component is assumed to have been removed by the feedback ACC. The orthogonal components A and B obtained by the Hilbert filter 16 are applied to both the phase detecting circuit 18 and the amplitude detecting circuit 20, respectively. In the phase detecting circuit 18, the phase component $\tan^{-1}(B/A)$ is detected by use of a $\tan^{-1}$ ROM. Further, in the amplitude detecting circuit 20, the amplitude component $(A^2+B^2)^{\frac{1}{2}}$ is detected by use of a $(A^2+B^2)^{\frac{1}{2}}$ ROM.

When the input signal $\Phi_1(t)$ as expressed by the formula (1) is passed through the Hilbert filter 16, the following two signals $\Phi_{1A}(t)$ as expressed by the formula (2) and $\Phi_{1B}(t)$ as expressed by the formula (3) can be obtained, where $\theta_0''$ denotes the initial phase after having been filtered:

$$\Phi_{1A}(t) = \qquad \text{[formula 2]}$$

$$A(t)\cos\left(\omega_{629k} \cdot t + M \cdot X(t) + D\omega \int_0^t Y(t)dt + Z(t) + \theta_0'' \right)$$

$$\Phi_{1B}(t) = \quad \text{[formula 3]}$$

$$A(t)\sin\left(\omega_{629k} \cdot t + M \cdot X(t) + D\omega \int_0^t Y(t)dt + Z(t) + \theta_0''\right)$$

On the basis of these formulae, the output $\Phi_3$ of the phase detecting circuit 18 can be expressed as follows:

$$\Phi_{1B}(t)/\Phi_{1A}(t) = \quad \text{[formula 4]}$$

$$\tan\left(\omega_{629k} \cdot t + M \cdot X(t) + D\omega \int_0^t Y(t)dt + Z(t) + \theta_0''\right)$$

$$\Phi_3 = \tan^{-1}(\Phi_{1B}(t))/(\Phi_{1A}(t)) \quad \text{[formula 5]}$$

$$= \omega_{629k} \cdot t + M \cdot X(t) + D\omega \int_0^t Y(t)dt + Z(t) + \theta_0''$$

By the way, the phase component returns to the original phase value through 360 degrees. In this embodiment, therefore, the phase component is represented on the basis of modulo. For instance, in the case of 370 degrees, when divided by 360 degrees, the quotient is 1 and the remainder is 10 degrees. Therefore, the phase component at an angle is eventually the same as that of a remainder angle. On the basis of the above-mentioned processing, it is possible to simplify the processing of the respective subsequent circuits, thus simplifying the circuit configuration.

Figure 3A:
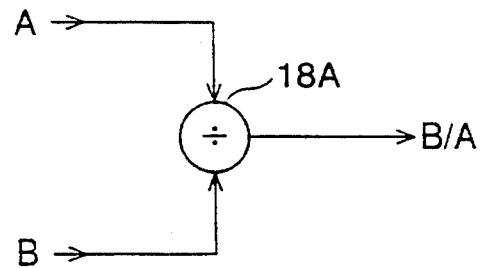
FIGS. 3A and 3B are block diagrams showing an example of the phase detecting circuit incorporated in the embodiment circuit shown in FIG. 2, respectively.

Here, the phase detecting circuit 18 will be further explained on the basis of an example. Ten bits are allocated to an angle of 360 degrees. When a divisional calculation of B/A is executed by a simple dividing circuit 18A as shown in FIG. 3A, it is necessary to carry the dividend B to the total 20-bits of an addition of the 10-bit divisor A and the 10-bit quotient. Therefore, 20 full adders and 20 shift registers are required in the case of even a serial divisional calculation. In addition, since another data must be calculated when one calculation is being executed, additional 20 sets of the above-mentioned constructions are necessary, with the result that a considerable number of gates are required in total. Further, it is not practical way of constructing this divider circuit by 20 bits with the use of a ROM (because about 1050, 000 addresses are necessary).

Figure 3B:
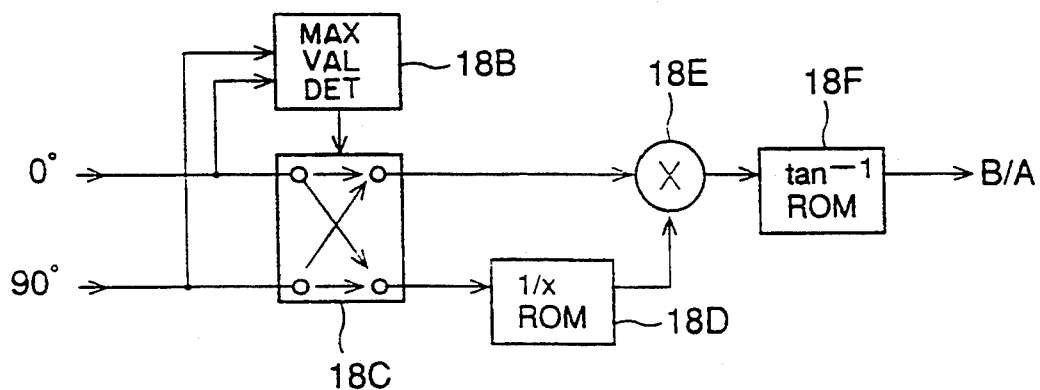

To overcome above-mentioned problem, in this embodiment, as shown in FIG. 3B, the phase detecting circuit 18 is composed of a maximum value detection circuit 18B, a selection switch 18C, a (1/X) ROM 18D, a multiplier 1BE, and an $\tan^{-1}$ ROM 18F. The divisor A is once inputted to the (1/X) ROM 18D, and thereafter the dividend B is divided by use of the multiplier 18E. However, it is not preferable that the input A to the (1/X) ROM 18D is [0]. In addition, the B/A calculation executed by the succeeding stage multiplier 18E must be considered. Therefore, since the phase precision can be improved by inputting data of less than 1 to the (1/X) ROM 18D, it is preferable to use such data that the divisor A is larger than the dividend B (i.e., B/A < 1). Therefore, data is switched by changing over the selection switch 18C by the maximum value detection circuit 18B in such a way that the larger one of the data is inputted to the (1/X) ROM 18D as the divisor A.

Further, since the tan is a function of a period of $\pi$, the detection range of the $\tan^{-1}$ (B/A) seems to be $\pm\pi/2$. However, since the quadrant is also clear as far as the signs of the inputs A and B are known, it is possible to detect the phase within the range of $\pm\pi$ (i.e., 360 degrees) by this range of $\pm\pi/2$. When the number of gates of the circuit as described above is roughly counted, the number of gates is about 400 gates or less, so that this number of gates is sufficiently realizable.

Further, the output $\Phi_2$ of the amplitude detecting circuit 20 can be expressed by the following formula:
[formula 6]

$$\Phi_2 = \sqrt{(\Phi_{1A}(t)^2 + \Phi_{1B}(t)^2)} = A(t)$$

The ROT releasing circuit 21 shown in FIG. 2 is a circuit for releasing the phase rotation and thereby returning the signal phase shifted by 90 degrees to the original phase for each horizontal scanning period (1H) for elimination of the crosstalk. When expressed by the above-mentioned formula, the $\omega_{629k}$ expressed by the formula (5) is shifted 90 degrees by 90 degrees for each 1H by the phase rotation. In order to return the 4-phase rotation executed in the recording operation to the original phase, in this embodiment, the most and second-to-most significant (two higher significant) bits of the phase component are operated.

Figure 4:
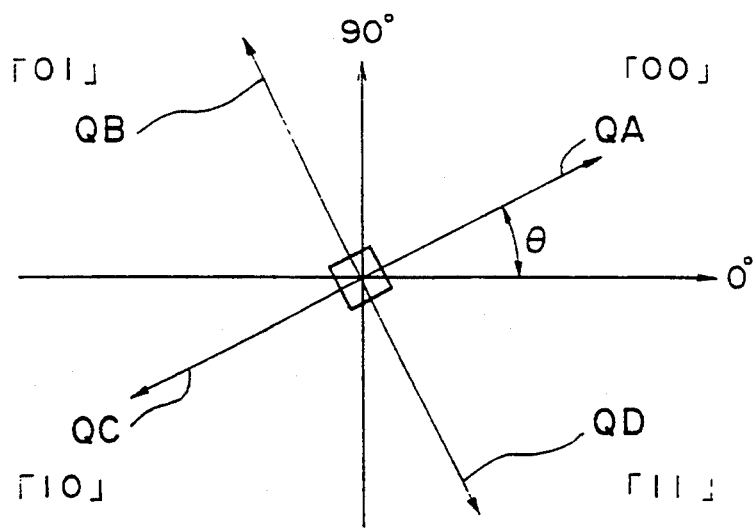
FIG. 4 is a graphical representation for assistance in explaining the function of the ROT releasing circuit incorporated in the embodiment circuit shown in FIG. 2.

This operation will be described with reference to FIG. 4. In 10-bit data representative of a phase $\theta$ by a vector QA [00********] (* is 0 or 1), if the two higher significant bits are [01], since data QA [00] is to be rotated by 90 degrees, the vector QA changes to a vector QB. In the same way, if the two higher significant bits are [10], since the data QA is further rotated by 90 degrees, the vector QA changes to a vector QC. In the same way, if the two higher significant bits are [11], since the data QA is further rotated by 90 degrees, the vector QA changes to a vector QD. As described above, in the ROT releasing circuit 21, it is possible to release the phase rotation by using the two higher significant bits of the input phase data.

Figure 1:
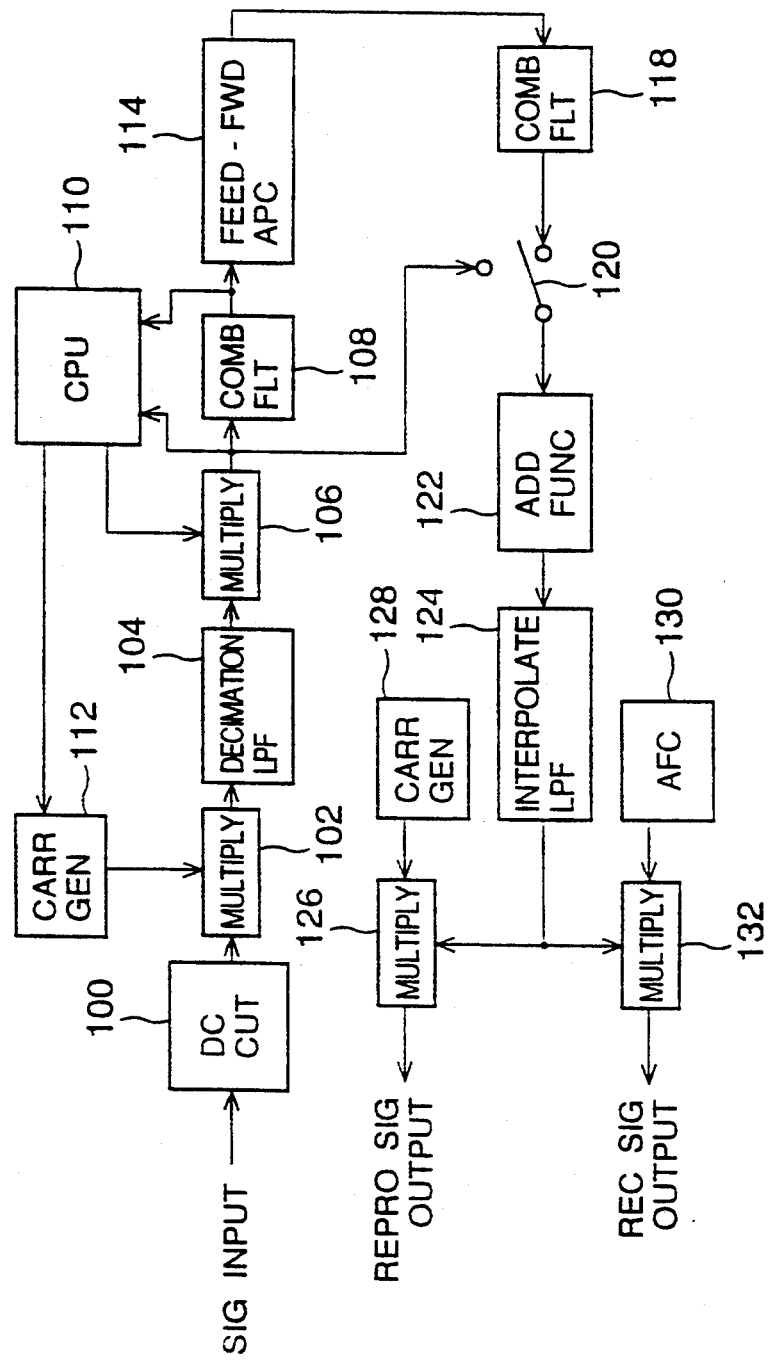
FIG. 1 is a block diagram showing an example of the prior art chrominance signal processing circuit.

The decode circuit 22 is a circuit which corresponds to the multiplier 102 of the prior art circuit as shown in FIG. 1. This decode circuit 22 serves to remove the phase component $\omega_{629k}$ of the phase data $\Phi_3$ released from the phase rotation by the above-mentioned ROT releasing circuit 21. In more detail, since the phase component of the chrominance signal is being rotated at an angular frequency (or velocity) of $\omega_{629k}$ (in other words, the phase data representative of hue is being modulated by the angular frequency $\omega_{629k}$), it is necessary to execute the processing of removing this modulation angular frequency component $\omega_{629k}$.

Figure 5:
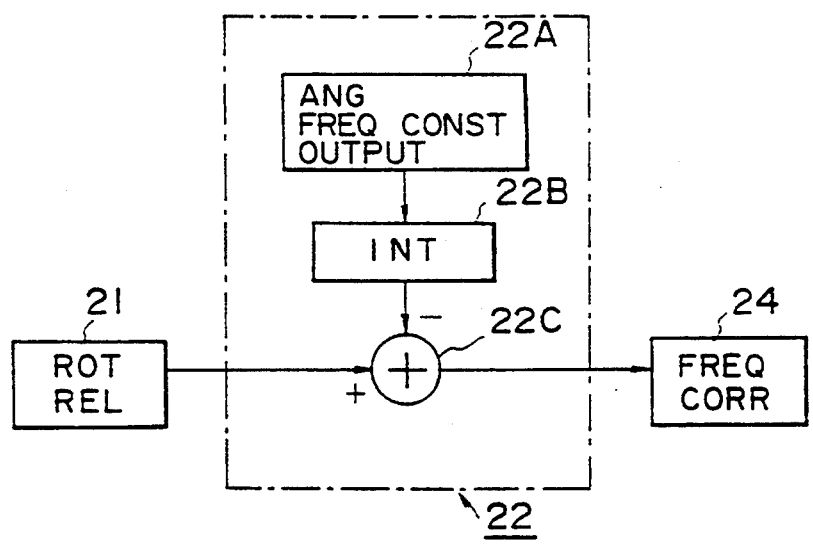
FIG. 5 is a block diagram showing an example of the decode circuit incorporated in the embodiment circuit shown in FIG. 2.

FIG. 5 shows an example of the decode circuit 22. As shown, an angular frequency constant outputting circuit 22A outputs an angular frequency constant $\omega_{629k} \times T$ (T: one clock period). This angular frequency constant is a unit rate at which the phase data $\Phi_3$ is advanced (or delayed) by one clock. The outputted angular frequency constant is integrated by an integrating circuit 22B composed of an adder and a delay circuit. Accordingly, a subtracter 22C outputs phase data $\Phi_4$ obtained by subtracting this angular frequency constant $\omega_{629} \times T$ from the $\Phi_3$ and further by decoding the subtracted data. In this embodiment, in the case where the integrating circuit 22B uses the afore-mentioned modulo by using the number of bits the same as that of the input data, it is possible to simply realize the processing of returning data to the original data through 360 degrees, without increasing the number of bits for integration processing.

Further, in the case where the modulation angular frequency $\omega_{629kR}$ in recording is different from the modulation angular frequency $\omega_{629kP}$ in reproduction or where a special reproduction is effected, a beat angular frequency $(\omega_{629kR}-\omega_{629kP})$ remains. In this case, however, the remaining beat angular frequency is corrected by a succeeding stage frequency correcting circuit 24. The output $\Phi_4$ of this decode circuit 22 can be expressed by the following formula 7:

$$\Phi_4 = (\omega_{629kR} - \omega_{629kP}) \cdot t + M \cdot \qquad \text{[formula 7]}$$
$$\left( X(t) + D\omega \int_0^t Y(t)dt + Z(t) + \theta_0'' \right)$$

A practical numerical example will be explained. First, an example of 10-bit representation (1024) in the NTSC (National Television System Committee) system is explained. Here, the horizontal synchronizing frequency is $f_H=15.734$ KHz; the subcarrier frequency is $f_{SC}=3.579$ MHz=(455/2) $f_H$; and the sampling frequency of the chrominance signal is $f_{SMP}=4$ $f_{SC}$. Since the low-band converted carrier chrominance frequency is $f_C=40$ $f_H$, the angular frequency constant $\omega_{629k} \times T$ can be expressed by the following formula 8:

$$\omega_{629k} \cdot T = (f_C/f_{SMP}) \times 1024 \qquad \text{[formula 8]}$$
$$= 45 \cdot 1$$
$$\approx 45$$

Next, an example of 9-bit representation (512) in the PAL (Phase Alternation By Line) system is explained. Here, the horizontal synchronizing frequency is $f_H=15.625$ KHz; the subcarrier frequency is $f_{SC}=4.433$ MHz=(1134/5) $f_H+25$ Hz; and the sampling frequency of the chrominance signal is $f_{SMP}=4$ $f_{SC}$. Since the low-band converted carrier chrominance frequency is $f_C=40.125$ $f_H$, the angular frequency constant $\omega_{629k} \times T$ can be expressed by the following formula 9:

$$\omega_{629k} \cdot T = (f_C/f_{SMP}) \times 512 \qquad \text{[formula 9]}$$
$$= 18 \cdot 1$$
$$\approx 18$$

The frequency correcting circuit 24 shown in FIG. 2 corrects the frequency of the phase data decoded by the decode circuit 22. When the phase data $\Phi_4$ expressed by the above-mentioned formula 7 is rewritten, the following formula 10 can be obtained:

$$\Phi_4 = M \cdot X(t) + \qquad \text{[formula 10]}$$
$$D\omega \int_0^t \{Y(t) + (1/D\omega)(\omega_{629kR} - \omega_{629kP})\}dt + Z(t) + \theta_0''$$

In the above formula 10, the second term represents the frequency modulation component. If this component exists, since a velocity error occurs, there arises such a problem that a hue offset is generated on the right side in a reproduced picture. Further, in this second term, Y(t) represents the frequency fluctuations of the input signal due to skew, for instance; and the beat angular frequency $(\omega_{629kR}-\omega_{629kP})$ is a steady-state error produced when there exists an offset in the angular frequency constant in the preceding stage decode circuit 22.

In this embodiment, the phase data $\Phi_4$ is first differentiated to extract the frequency modulation component of the second term. The extracted frequency modulation component can be expressed by the following formula 11:

$$d\ \Phi_4/dt = d(M \cdot X(t))/dt + \qquad \text{[formula 22]}$$
$$D\omega(Y(t1) - Y(t2)) + (\omega_{629kR} - \omega_{kP}) + dZ(t)/dt$$

The first term of this formula 11 is obtained by differentiating the input signal modulation component. However, as far as the burst portion is sampled, this differential value is zero. Further, the fourth term is a phase jitter component. However, this term is regarded to be zero when averaged over a long period of time (i.e., when integrated), so that the average value of the differentiation can be predicted as zero. Therefore, when the burst portion data are differentiated over several H (H: one horizontal scanning period), the following formula 12 can be obtained: When further differentiated, the following formula 13 can be obtained:

[formula 12]

$$d\Phi_4/d\ t = D\omega(Y(t1) - Y(t2))$$
$$+ (\omega_{629kR} - \omega_{629kP})$$

[formula 13]

$$d^2\Phi_4/d\ t^2 = D\ \omega\ (d/d\ t)\ (Y(t1) - Y(t2))$$

When the formula 13 is zero, this indicates that the angular frequency beat component $(\omega_{629kR}-\omega_{629kP})$ is outputted in the formula 12. As described above, in practice, since the data sampled at time intervals of 1H (i.e., integrated over a time of 1H) are differentiated, the obtained data is $(\omega_{629kR}-\omega_{629kP}) \times (1H\ time)$. In any case, as far as the formula 13 stores the angular frequency beat component $(\omega_{629kR}-\omega_{629kP})$ at the state of [0] and further canceled in the steady-state, only the skew component remains in the formula 12, so that it is possible to accurately detect the correction rate of the phase data $\Phi_4$ even in the case of sudden frequency fluctuations.

Figure 6:
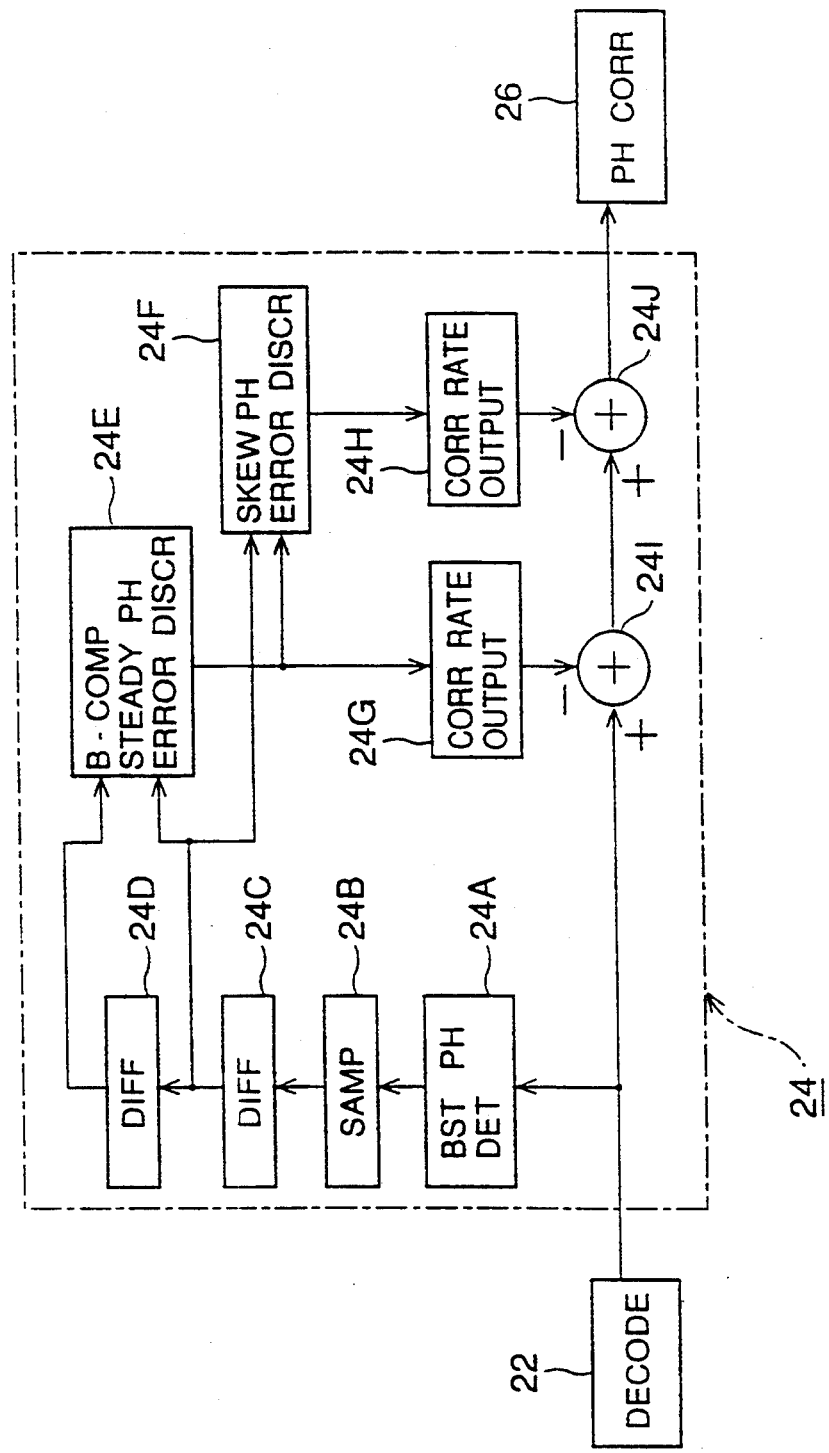
FIG. 6 is a block diagram showing an example of the frequency correcting circuit incorporated in the embodiment circuit.

With reference to FIG. 6, an example of the frequency correcting circuit 24 based upon the above-mentioned technique will be explained hereinbelow. The output side of the decode circuit 22 is connected to a burst phase detecting circuit 24A. The output of this circuit 24A is connected to a sampling circuit 24B composed of an adder and a delay circuit. The output side of this circuit 24B is connected in series to two differentiating circuits 24C and 24D each composed of a subtracter and an n-bit flip-flop.

The two output sides of the two differentiating circuits 24C and 24D are connected to a beat component steady-state phase error discriminating circuit 24E. Further, the output sides of the differentiating circuit 24C and the beat 30 component steady-state phase error discriminating circuit 24E are connected to a skew phase error discriminating circuit 24F, respectively. Further, the output sides of the two phase error discriminating circuits 24E and 24F are connected to two correction rate outputting circuits 24G and 24H, respectively. The output sides of these circuits 24G and 24H are connected to subtraction sides of two subtracters 24I and 24J, respectively.

In the above-mentioned circuit, the burst phase detecting circuit 24A detects the burst phase on the basis of the burst gate pulse. The detected data are integrated by the sampling circuit 24B over nH, and further differentiated by the differentiating circuits 24C and 24D, respectively, so that it is possible to obtain the aforementioned formulae 12 and 13, respectively.

The beat component steady phase error discriminating circuit 24E obtains the angular frequency beat component ($\omega_{629kR} - \omega_{629kP}$) (expressed in the formula 12) determined when the formula 13 is [0], as already explained, to discriminate the beat component steady phase error. The discriminated result is supplied to the correction rate output circuit 24G, so that the circuit 24G outputs a correction rate corresponding thereto to the subtracter 24I. The subtracter 24I subtracts the correction rate from the phase data decoded by the decode circuit 22, to correct the beat component steady phase error.

Further, the skew phase error discriminating circuit 24F subtracts the angular frequency beat component ($\omega_{629kR} - \omega_{629kP}$) obtained by the beat component steady phase error discriminating circuit 24E from the formula 12, to discriminate the skew phase error. The discriminated result is supplied to the correction rate output circuit 24H, so that the circuit 24H outputs a correction rate corresponding thereto to the subtracter 24J. The subtracter 24J subtracts the correction rate from the phase data whose beat component steady phase error has been corrected, to correct the skew phase error.

An example of deciding an actual correction rate will be explained hereinbelow.

(1) Correction of angular frequency beat component

Figure 7A:
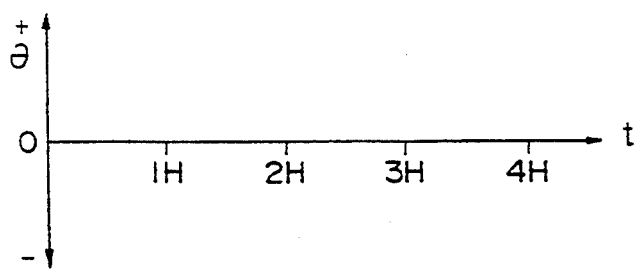
FIGS. 7A to 7D are graphical representations for assistance in explaining the relationship between the steady phase errors and the horizontal scanning periods in both the recording and reproducing operation.
Figure 7B:
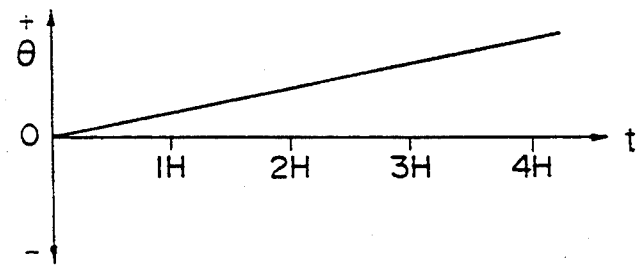
Figure 7C:
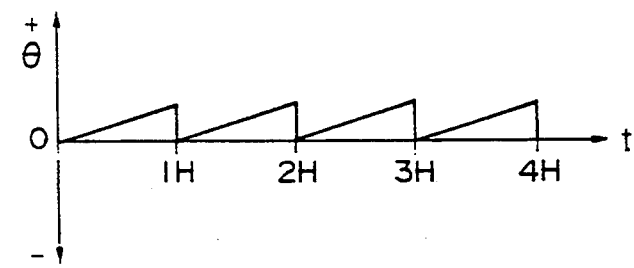
Figure 7D:
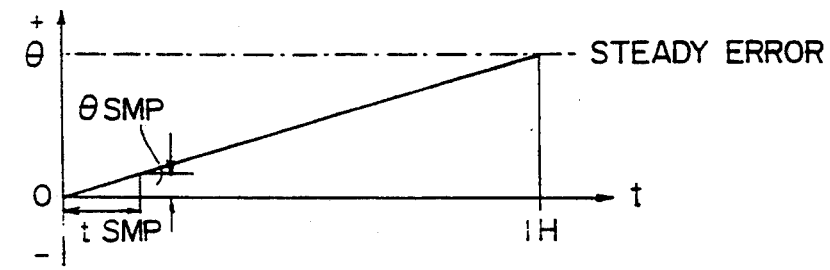

FIGS. 7A to 7D show the change in the steady phase data error (phase shift) $\theta$ between the angular frequency $\omega_{629kR}$ in recording operation and the angular frequency $\omega_{629kP}$ in reproducing operation. When $\omega_{629kR} - \omega_{629kP} = 0$, the beat component is absent, as shown in FIG. 7A, so that the steady error $\theta$ is also [0]. When $\omega_{629kR} - \omega_{629kP} \neq 0$, the steady error is accumulated with the lapse of time, as shown in FIG. 7B. When the steady phase data error $\theta$ is sampled over a time of 1H and differentiated, the same rate of the steady error $\theta$ is repeated for each time period of 1H, as shown in FIG. 7C or in FIG. 7D (in which the steady error $\theta$ is enlarged during only one horizontal period 1H).

On the basis of the steady error $\theta$, an error $\theta_{SMP}$ which corresponds to $t_{SMP}$ is obtained. When this error $\theta_{SMP}$ is canceled, the velocity error will not be generated. In practice, however, since the phase data is represented by a digital signal of a finite number of bits, if the angle 360 degrees is allocated to 10 bits, for instance, one bit corresponds to $\theta_{min} = 360$ degrees/$1024 = 0.3515625$ degrees, so that it is impossible to control the phase angle less than $\theta_{min}$. In other words, the phase can be corrected in the minimum unit of 0.3515625 degrees.

For instance, when this minimum phase angle $\theta_{min}$ is kept corrected for each sampling time, in the case of the NTSC system, since 910 sampling periods exist during the one horizontal scanning period 1H (after 1H), the corrected phase shift is as large as $\theta_{min} \times 910 = 320$ degrees. In this embodiment, therefore, the phase shift is corrected at the rate of one to several sampling periods, so that the phase shift can be reduced below a detectable possible limit without reducing the phase shift down to zero.

(2) Skew component correction

As expressed by the formulae 12 and 13, since the skew component can be obtained by monitoring the formula 12 under the condition that the angular frequency beat component ($\omega_{629kR} - \omega_{629kP}$) is being corrected, it is possible to correct the skew component in the same procedure as with the case of the correction of the angular frequency beat component $\omega_{629kR} - \omega_{629kP}$).

The phase correcting circuit 26 shown in FIG. 2 is a circuit for correcting the jitter. The phase data $\Phi_5$ whose frequency has been corrected by the above-mentioned frequency correcting circuit 24 can be expressed by the following formula 14:

[formula 14]

$$\Phi_5 = M \cdot X(t) + Z(t) + \theta_0''$$

Here, since $M \times X(t) = 0$ at the burst portion, the phase data $\Phi_5$ represents the jitter component $Z(t)$ and the initial phase $\theta_0''$ as it is. Therefore, when the burst phase is detected and further when the phase is offset (for phase correction) in such a way that the detected burst phase can be zeroed to [0] for each horizontal scanning period, it is possible to cancel both the jitter component and the initial phase component.

Figure 8A:
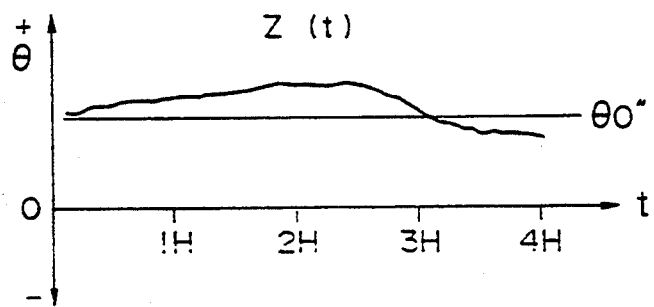
FIGS. 8A to 8C are graphical representations for assistance in explaining the phase corrections in the embodiment circuit.
Figure 8B:
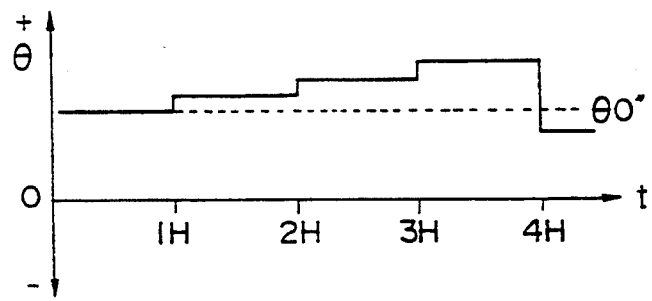
Figure 8C:
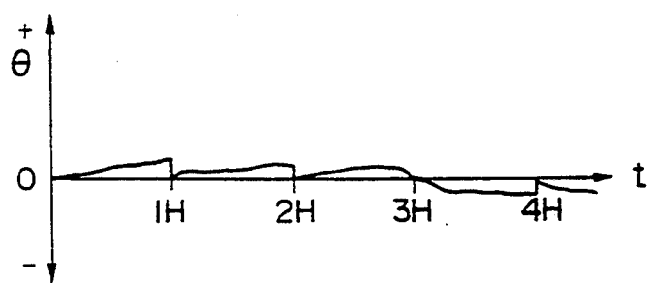

FIG. 8A shows an example of the steady error (phase shift) $\theta$ including the jitter component $Z(t)$ and the initial phase $\theta_0''$. FIG. 8B shows the offset rate thereof obtained by sampling the burst portion thereof. FIG. 8C shows the phase shift (error) $\theta$ obtained by subtracting the offset rate shown in FIG. 8B from the steady error shown in FIG. 8A, in which the jitter component $Z(t)$ and the initial phase component are both canceled.

Figure 9:
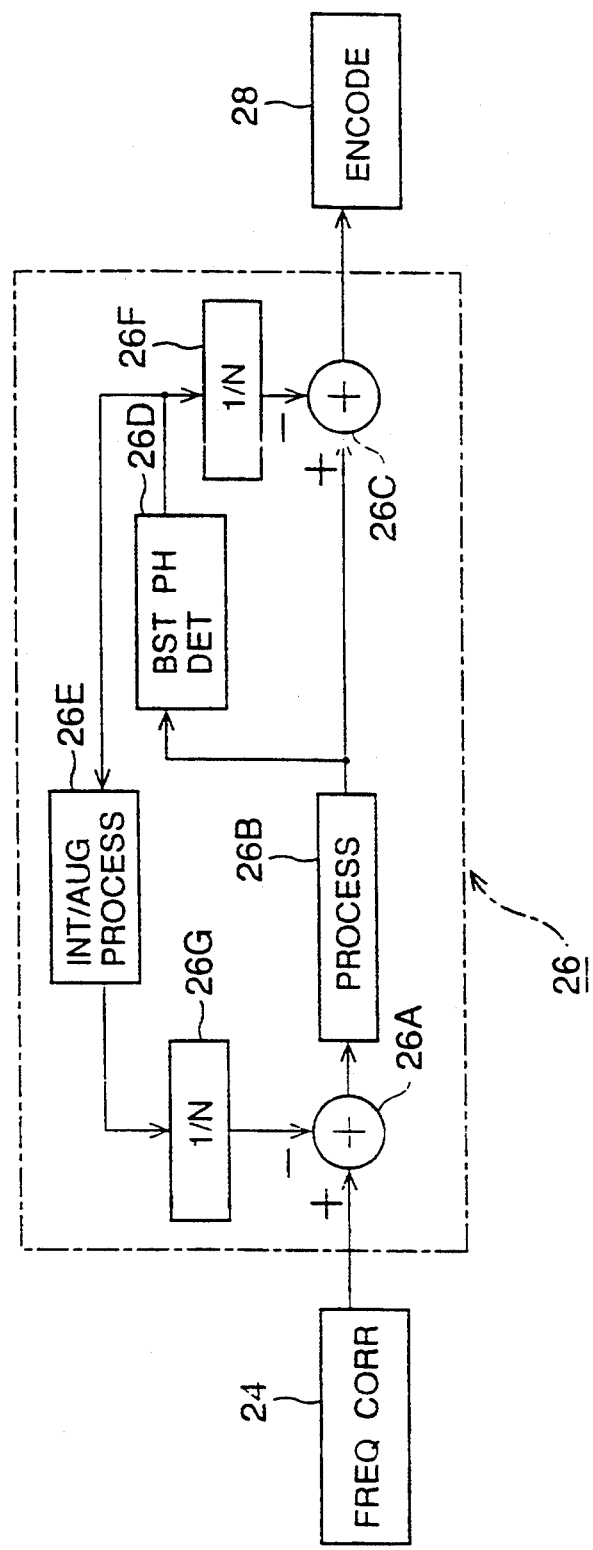
FIG. 9 is a block diagram showing an example of the phase correcting circuit incorporated in the embodiment circuit.

FIG. 9 shows an example of the phase correcting circuit 26. In FIG. 9, the output side of the frequency correcting circuit 24 is connected to a subtracter 26A, and the output side of the subtracter 26A is connected to another subtracter 26C and a burst phase detecting circuit 26D via a processing circuit 26B. The processing circuit 26B detects a sudden phase change or a drop out for correction, or processes (such as, limitation, dropping out, noise detection) the phase change for prevention of an excessive correction. The output side of the burst phase detecting circuit 26D is connected to an integrate-average processing circuit 26E and a (1/N) circuit 26F. The output side of the integrate-average processing circuit 26E is connected to a (1/N) circuit 26G. Further, the output sides of the two (1/N) circuits 28F and 26G are connected to subtraction input sides of the two subtracters 26C and 26A, respectively.

In the case of this example, the jitter component $Z(t)$ and the initial phase $\theta_0''$ are both corrected, separately. The average value of the jitter component $Z(t)$ is [0]. Therefore, when the burst phase $\Phi_5$ detected after having been added at N points by the burst phase detecting circuit 26D is processed by the integrate-average processing circuit 26E, the initial phase $\theta_0''$ can be obtained. The obtained initial phase $\theta_0''$ is divided into 1/N by the 1/N circuit 26G and then supplied to the subtracter 26A to correct the initial phase $\theta_0''$ of the phase data.

Further, since the behavior of the jitter $Z(t)$ can be detected by differentiating the burst phase $\Phi_5$, it is possible to obtain the initial phase $\theta_0''$ by detecting the burst phase $\Phi_5$ when the jitter $Z(t)$ is not moving; that is, when $dZ(t)/dt=0$.

The phase data in which the initial phase $\theta_0''$ is canceled is supplied to the processing circuit 26B for processing such as limiter, drop out, noise detection, etc. The processed phase data is supplied to the subtracter 26C. To this subtracter 26C, the output of the burst phase detecting circuit 26D is supplied via the 1/N circuit 26F. Since the component of the initial phase $\theta_0''$ is previously canceled by the subtracter 26A, it is possible to correct only the jitter $Z(t)$ in the vicinity of the phase [0] by the subtraction of the subtracter 26C. The above-mentioned example is effective when the jitter $Z(t)$ correction is limited or when the drop out and the noise detection are executed. In other words, it is possible to easily discriminate whether the present data is steady or not steady (excessive) by correction on the basis of the past data.

In the above-mentioned example, the data are added at N points for the burst phase detection. This is because the influence of the noise can be eliminated by averaging the data within the burst. Further, the 1/N processing is made after the integration. This is because the influence of the quantization error can be eliminated. In this connection, the selection of a multiplier of 2 as N is effective when the 1/N is obtained. Although not explained particularly, it is desirable to average the N-point data within the burst even in the frequency correcting circuit 24, when the burst is sampled to obtain phase data.

Figure 10:
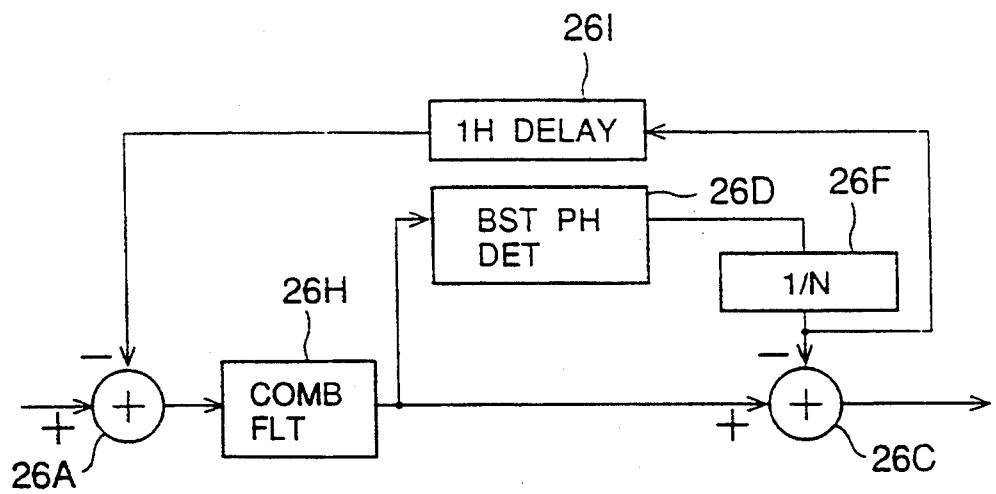
FIG. 10 is a block diagram showing another example of the phase correcting circuit incorporated in the embodiment circuit.

FIG. 10 shows an example of the phase correcting circuit 26. The output side of the above-mentioned subtracter 26A is connected to a comb filter 26H, and the output side of this filter 26H is connected to another subtracter 26C and a burst phase detecting circuit 26D, respectively. Further, the output side of the burst phase detecting circuit 26D is connected to a 1/N circuit 26F, and the output side of the 1/N circuit 26F is connected to both the subtracter 26C and a 1H delay circuit 26I. Further, the output side of this circuit 26I is connected to a subtraction input side of the subtracter 26A.

In this example, the phase is previously corrected by use of the information obtained before 1H (one horizontal scanning period), without use of the initial phase $\theta_0''$. This method is effective when the comb filter 26H is interposed between the two subtracters 26A and 26C. This is because when the phase vector of the current data is not directed to that of the succeeding data to some extent, the crosstalk cancellation effect is reduced from the standpoint of the comb filter characteristics.

The encode circuit 28 shown in FIG. 2 is a circuit for converting the phase data whose phase is corrected by the phase correcting circuit 26 into a predetermined high frequency band. The phase data $\Phi_6$ whose jitter component $Z(t)$ and the initial phase $\theta_0''$ have been both corrected by the phase correcting circuit 26 can be expressed by the following formula 15:

[formula 15]

$$\Phi_6 = M.X(t)$$

Since this phase data is the phase modulation component of the input chromatic signal itself, it is possible to obtain the phase component converted into a modulated phase component, that is, into a predetermined frequency band by adding an angular frequency component corresponding to a desired output frequency (e.g., 3.58 MHz). The basic processing method is the same as with the case of the decode circuit 22.

Figure 11:
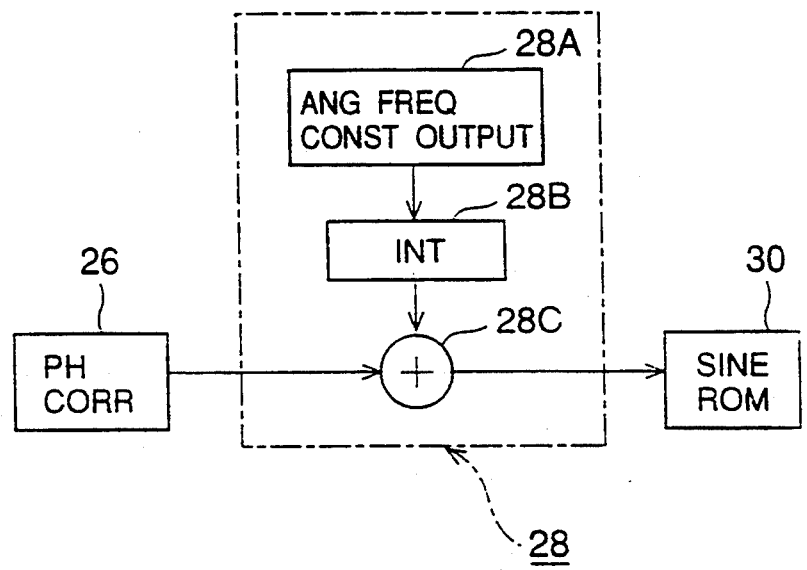
FIG. 11 is a block diagram showing an example of the encode circuit incorporated in the embodiment circuit.

FIG. 11 shows an example of the encode circuit 28 including an angular frequency constant outputting circuit 28A, an integrating circuit 28B and an adder 28C. The angular frequency constant outputting circuit 28A obtains the angular frequency constant for one clock period in the same way as with the case of the decode circuit 22. During this encoding, since it is possible to use a free-running angular frequency $\Phi_{3.58M}$ of 3.58 MHz, the angular frequency constant is simply added to the phase data without managing the phase. The phase data after encoding can be expressed by the following formula 16:

[formula 16]

$$\Phi_7 = \omega_{3.58M}.t + M.X(t)$$

The sine ROM 30 shown in FIG. 2 is used to obtain waveform data by using the phase data converted into high frequency band by the encode circuit 28 as the addresses. Owing to the conversion processing of the sine ROM 30, it is possible to obtain a phase-modulated and amplitude-constant continuous wave signal whose phase corresponds to the input chrominance signal. This signal can be expressed by the following formula 17:

[formula 17]

$$\Phi_8 = sin\ (\omega_{3.58M}.t + M.X(t))$$

The multiplier 32 shown in FIG. 2 is a circuit for adding the amplitude data detected by the amplitude detecting circuit 20 to the above-mentioned phase data. The chromatic signal data after multiplication can be expressed by the following formula 18, where $A(t)$ is the amplitude component:

[formula 18]

$$\Phi_9 = A(t).sin\ (\omega_{3.58M}.t + M.Z(t))$$

The burst deemphasis circuit 36 shown in FIG. 2 is a circuit for reducing the amplitude component (obtained by the amplitude detecting circuit 20 at only the burst portion) by a predetermined level (e.g., 6 dB). Since it takes time to process the phase data, it is necessary to execute the burst deemphasis processing within a sufficient time interval. In other words, in this embodiment, this burst deemphasis can be processed without using a multiplier composed of a large number of elements.

The operation of the digital chrominance signal reproducing circuit constructed shown in FIG. 2 will be described hereinbelow. The analog low-band converted chrominance signal read out of a video tape, for instance is ACC (automatic chroma level control) processed by the variable amplifier 10, the ACC circuit 38 and the PWM circuit 40. After that, the processed signal is supplied to the A/D converter 12 for conversion into digital signals. The DC component of the digital chrominance signals is cut off by the dc-cutting circuit 14, and then supplied to the Hilbert filter 16 to obtain two orthogonal components of 0 degrees and 90 degrees. The obtained orthogonal components are supplied to the phase detecting circuit 18 and the amplitude detecting circuit 20, respectively to obtain the phase data and the amplitude data, respectively.

Thereafter, the phase rotation of the phase data (obtained during the chromatic signal recording) is released by the ROT releasing circuit 21, and the angular frequency component thereof is detected by the decode circuit 22. After that, the beat component steady phase error and the skew phase error are both removed by the frequency correcting circuit 24, and further the jitter and initial phase are corrected by the phase correcting circuit 26.

The phase data corrected as described above are supplied to the encode circuit 28, to add the angular frequency component of 3.58 MHz to the phase data. Further, the phase data are changed into continuous wave phase data by the sine ROM 30. The data thus obtained are multiplied by the amplitude data (whose burst component is reduced by the burst deemphasis circuit 36) by the multiplier 32, to obtain the high-band converted chrominance signal data. The digital chrominance signal data thus obtained are further converted into analog high-band chrominance signal by the D/A converter 34.

The embodiment of the digital chrominance signal reproducing circuit is provided with the following effects:

(1) In comparison with the prior art circuit, the number of the multipliers can be reduced down to about ½ and further the number of elements can be reduced by about 20 to 30%, so that it is possible to simplify the circuit configuration as a whole. Consequently, the circuit can be easily constructed in a single IC chip, thus reducing the manufacturing cost due to the reduction of the number of elements required.

(2) Since the phase data are processed by use of modulo, it is possible to improve the resolution of hue, in spite of the fact that the number of bits of the phase data is constant.

(3) Since the data are processed by separating the amplitude data from the phase data or vice versa, it is possible to control the hue and color density easily, thus allowing the circuit to be suitable when the circuit can be multi-functioned.

(4) Owing to the digital circuit, there exist such other advantages that the processing is stable in operation and high in reliability; the dispersion in characteristics between the ICs is small so that the adjustment points and the external parts can be reduced markedly; the multi-function can be enabled so that the system can be further developed extensively.

Figure 12:
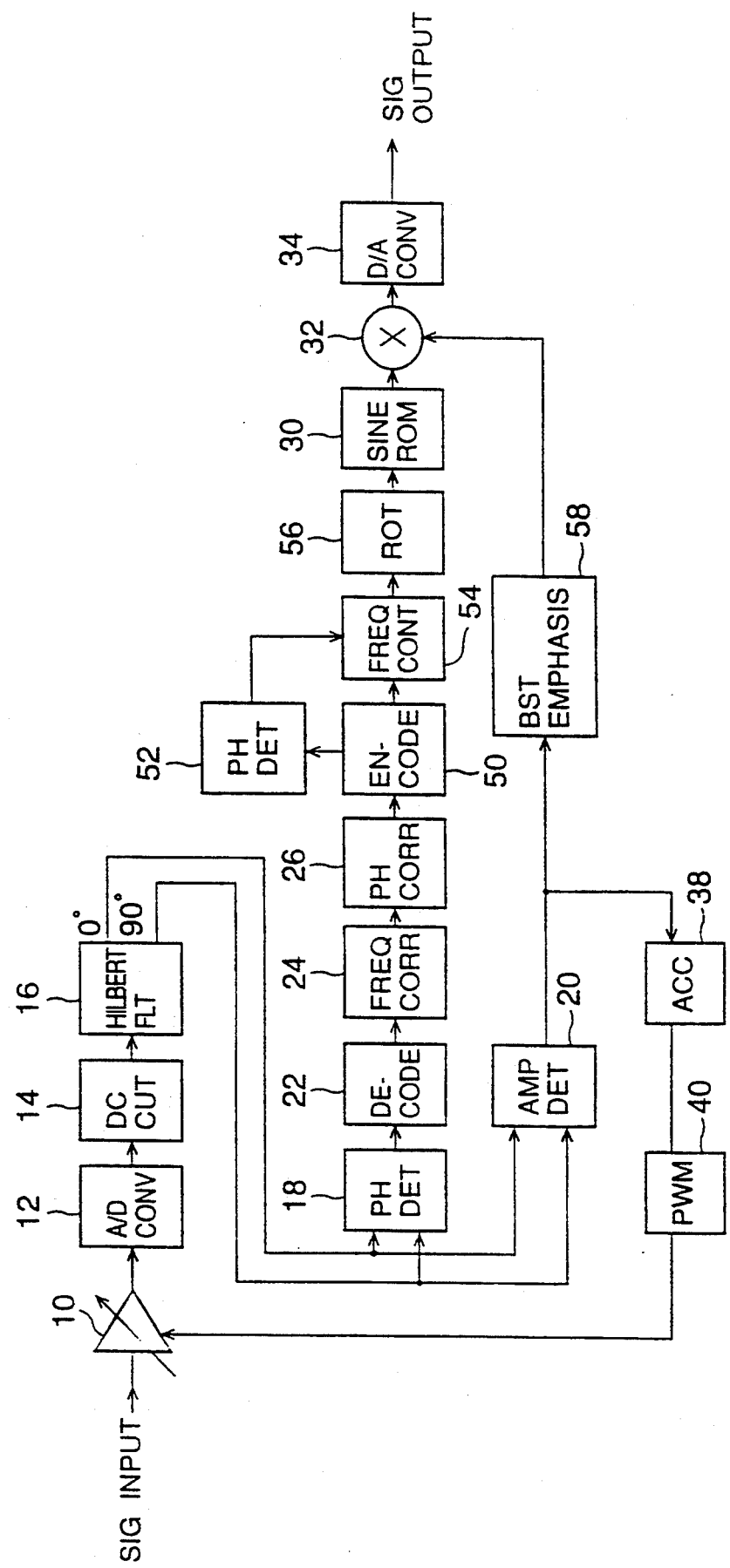
FIG. 12 is a block diagram showing an embodiment of the digital chrominance signal recording circuit according to the present invention.
Figure 13:
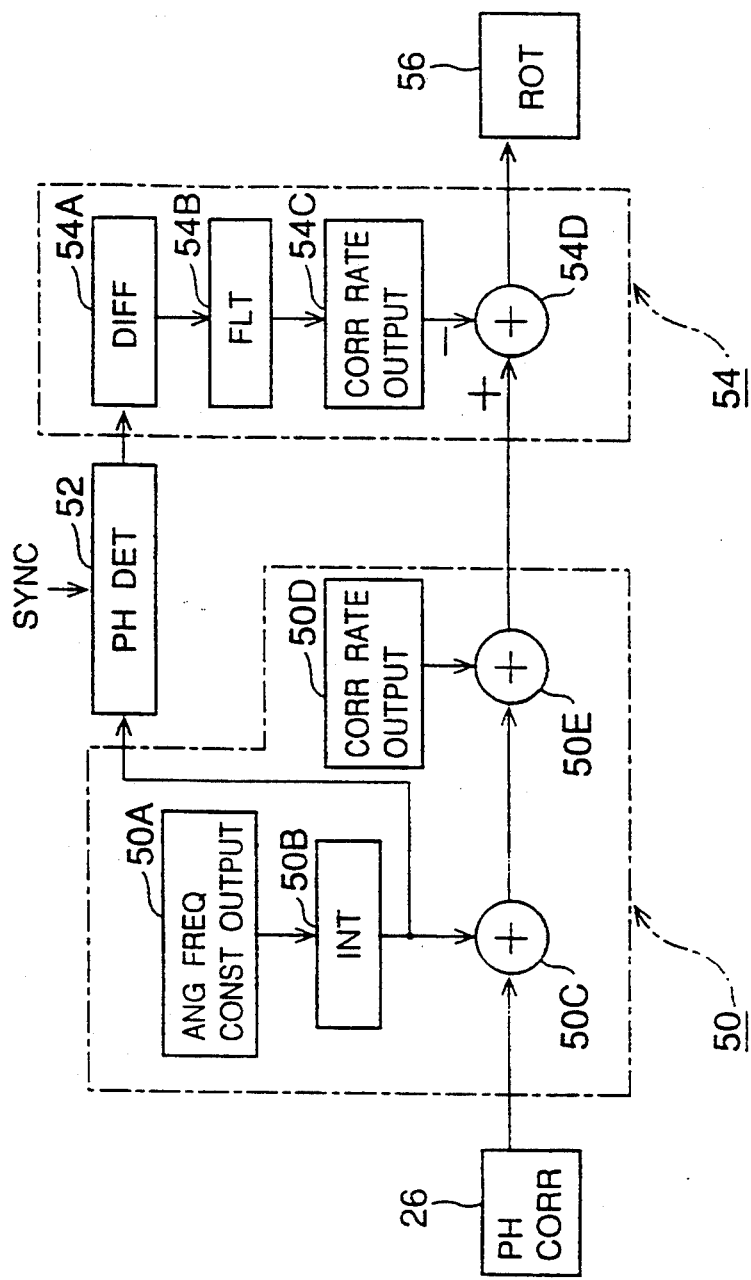
FIG. 13 is a clock diagram showing an example of the characterized portion of the embodiment circuit shown in FIG. 12.

With reference to FIGS. 12 to 13, an embodiment of the digital chrominance signal recording circuit will be described hereinbelow. The same reference numerals have been retained for the similar elements and parts which have the same functions as with the case of the reproducing circuit already explained with reference to FIG. 2. FIG. 12 shows the overall circuit configuration of the recording circuit. In FIG. 12, the high-band chrominance signal obtained from the television signal is inputted to a variable amplifier 10. The output side of the variable amplifier 10 is connected to the input side of a Hilbert filter 16 via an A/D converter 12 and a dc-cutting circuit 14, respectively. The respective output sides of the 0-degree component and the 90-degree component of the Hilbert filter 16 are connected to both a phase detecting circuit 18 and an amplitude detecting circuit 20, respectively.

Further, the output side of the phase detecting circuit 18 is connected to a decode circuit 22; the output side of this circuit 22 is connected to a frequency correcting circuit 24; and the output side of this circuit 24 is connected to a phase correcting circuit 26. Further, the output side of the phase correcting circuit 26 is connected to an encode circuit 50; the output of this circuit 50 is connected to a phase detecting circuit 52 and a frequency control circuit 54; and the output side of the phase detecting circuit 52 is connected to the frequency control circuit 54. The output side of the circuit 54 is connected to a ROT circuit 56. Further, the output side of this circuit 56 is connected to a D/A converter 34 via a sine ROM 30 and a multiplier 32.

Further, the output side of the amplitude detecting circuit 20 is connected to a burst emphasis circuit 58, and the output side of this circuit 58 is connected to the other input side of the multiplier 32. Further, the output side of the amplitude detecting circuit 20 is further connected to an ACC circuit 38, and the output side of this circuit 38 is connected to a PWM circuit 40. The output side of this PWM circuit 40 is connected to a control side of the variable amplifier 10.

The characterized composing portions of this recording circuit will be described hereinbelow. The encode circuit 50 is the same as the encode circuit 28 shown in FIG. 2 except that the angular frequency constant is changed. Therefore, the angular frequency component of 629 KHz is added to the phase data. In addition, since the phase detecting circuit 52 and the frequency control circuit 54 are added, on the basis of the loop formed by these elements, it is possible to process the control of increasing the recording frequency to a frequency 40 times the horizontal synchronizing frequency $f_H$, in the same way as AFC executed in the conventional analog system.

FIG. 13 shows an example of the encode circuit 50 and the frequency control circuit 54. The encode circuit 50 includes an angular frequency constant output circuit 50A, an integrating circuit 50B, and an adder 50C. The basic construction of this circuit 50 is the same as the encode circuit 28 of the reproducing circuit shown in FIG. 2, except that the angular frequency thereof is different from that of the reproducing circuit.

Further, the phase data processed by the decode circuit 22, the frequency correcting circuit 24 and the phase correcting circuit 26 all shown in FIG. 12, respectively are inputted to this encode circuit 50. The phase data thus inputted can be expressed by the following formula 19, which is the same as the formula 15 and represents the phase modulation component of the input chrominance signal:

[formula 19]

$$\Phi_{10} = M.X(t)$$

In the same way as with the case of the reproduction, in this encode circuit 50, the angular frequency constant output circuit 50A outputs an angular frequency constant which corresponds to a continuous wave signal of $\omega_{629k} \times t$. This angular frequency constant is integrated by the integrating circuit 50B. The integral value thereof is added to the phase data by the adder 50C for modulation.

However, in the same way as in the recording operation, since it is difficult to obtain an accurate phase of $\omega_{629k} \times t$ on the basis of the number of bits as small as 10 bits, it is necessary to correct the continuous wave signal periodically with the use of a correction rate output circuit 50D and an adder 50E.

The AFC loop for controlling the frequency to a frequency 40 times the horizontal synchronizing frequency $f_H$ will be explained hereinbelow. In the phase detecting circuit 52 as shown in FIG. 13, the output (the phase of $\omega_{629k} \times t$) of the integrating circuit 50B is read at the timing of the horizontal synchronizing signal $S_{syn}$. As already explained, since the frequency can be obtained by taking a difference between two phase data apart from each other with respect to time (i.e., by differentiation), this processing is made by a differentiating circuit 54A of the frequency control circuit 54. In accordance with this obtained frequency information, basically the frequency is corrected, in the same way as with the case of the decode circuit 22 as shown is FIG. 2.

However, since the timing of the horizontal synchronizing signal $S_{syn}$ is not related to the system clock, it is difficult to read the phase value (obtained when the horizontal synchronizing signal $S_{syn}$ is inputted) as data. Therefore, a reading error corresponding to one sampling time is produced at the maximum. The value transformed into the phase rate can be expressed by the following formula 20:

[formula 20]

$$(1/f_{SMP})/(1/f_C) = 15.82°$$

where the subcarrier frequency $f_{SC}$, the low-band converted carrier chrominance frequency $f_C$, and the chrominance signal $f_{SMP}$ are all already explained herein. The value of 15.82 degrees obtained as a result of the calculation by the formula 20 exceeds the detection limit range largely (about 2 degrees) on picture. Therefore, it is necessary to execute such a processing such that an average value of several frequency data is calculated; the frequency data is passed through a cyclic filter; the response speed is lowered by reducing the weighting value for each frequency control, etc., without controlling the frequency on the basis of only one frequency data. In this embodiment, the filter 54B is used as shown in FIG. 13. On the basis of the output of this filter 54B, a correction rate is outputted from the correction rate output circuit 54C to the subtracter 54D for execution of the frequency control.

The burst emphasis circuit shown in FIG. 12 is a circuit for increasing (e.g., 6 dB) the level of only the burst amplitude in order to improve the burst C/N (Carrier/Noise) ratio in a recording operation. Since the digital data are used in this embodiment, it is possible to construct the burst emphasis circuit 58 by use of a simple one-bit shift circuit.

The operation of the digital chrominance signal recording circuit constructed as shown in FIG. 12 will be described hereinbelow. The analog high-band chrominance signal obtained by the television signals, for instance is ACC (automatic chroma level control) processed by the variable amplifier 10, the ACC circuit 38 and the PWM circuit 40. After that, the processed signal is supplied to the A/D converter 12 for conversion into digital signals. The DC component of the digital chrominance signals is cut off by the dc-cutting circuit 14, and then supplied to the Hilbert filter 16 to obtain two orthogonal components of 0 degrees and 90 degrees. The obtained orthogonal components are supplied to the phase detecting circuit 18 and the amplitude detecting circuit 20, respectively to obtain the phase data and the amplitude data, respectively.

Thereafter, the angular frequency component of 3.58 MHz of the phase data is removed by the decode circuit 22. After that, the beat component steady phase error and the skew phase error are removed by the frequency correcting circuit 24, and further the jitter and the initial phase are corrected by the phase correcting circuit 26.

The phase data corrected as described above are supplied to the encode circuit 50, to add the angular frequency component of 629 KHz to the phase data. Further, the phase data are AFC processed by the phase detecting circuit 52 and the frequency control circuit 54. The phase data thus processed is further processed by the ROT circuit 56 for phase rotation (shift), and further changed into the continuous wave phase data by the sine ROM 30. The burst component of the obtained data is multiplied by the amplitude data (whose burst level is increased by the burst emphasis circuit 58) with the multiplier 32, so that it is possible to obtain the low-band converted chrominance signal data. The obtained digital chrominance signal data are further converted into analog low-band chrominance signal by the D/A converter 34.

The points to be considered when the present embodiment is applied to a PAL system will be described hereinbelow.

(1) Burst phase detection method

Being different from the NTSC system, in the case of the PAL system, since the phase of the burst signal changes alternately for each horizontal scanning period (1H), under due consideration of this point it is necessary to execute the phase detection and the related frequency and phase correction. For instance, the following methods can be adopted: (a) two burst phases at two adjacent horizontal scanning periods (2H) are averaged to execute the related control on the basis of the averaged phase data; (b) since two burst phases at two adjacent horizontal scanning periods (2H) are offset by 90 degrees from each other, one of the two phase data is offset by 90 degrees to match the two offset burst phases with respect to each other; (c) in the decode circuit, 90-degree alternating phase data are given for accumulation of the angular frequency constants, and then the obtained phase data is subtracted from the phase component of the input data to match the relative phase difference; (d) the phase difference in a predetermined direction is detected, and the two burst phases at two adjacent horizontal scanning periods (2H) are averaged to execute the related control, etc.

(2) Pilot burst

In the case of the S-VHS standard of the PAL system, a pilot burst is to be added in the signal recording operation. This can be realized by outputting a phase signal shifted by 90 degrees at a predetermined position in an averaged value direction in the encode operation, and further by adding a constant-amplitude data to the amplitude information at the same position. In this case, the pilot burst is determined to be +90 degrees or −90 degrees in accordance with the S-VHS standard. In the reproduction operation, the phase information of the pilot burst is controlled as the phase information of the burst. Further, when outputted, the amplitude is reduced down to zero to erase the pilot burst.

(3) 4-phase rotation

In the case of the PAL system, the 4-phase rotation must be effected for only one-side channel (i.e., one of two adjacent tracks) in accordance with the VHS standard. This can be realized simply by turning on or off the control of the two higher significant bits of the phase data in the ROT circuit.

Further, the above-mentioned embodiment has been described by way of example. Without being limited thereto, the embodiment can be modified, for instance as follows:

(1) In the above-mentioned embodiment, the function data for all the phases of 360 degrees are written in the $\tan^{-1}$ROM or the sine ROM. However, as clearly understood on the basis of the characteristics of these trigonometric functions, as far as the information related to the function data within $\pi/2$ is provided, it is possible to transform the data on the basis of the two higher significant bits representative of the sign bits of the input signal or the quadrant thereof.

Figure 14:
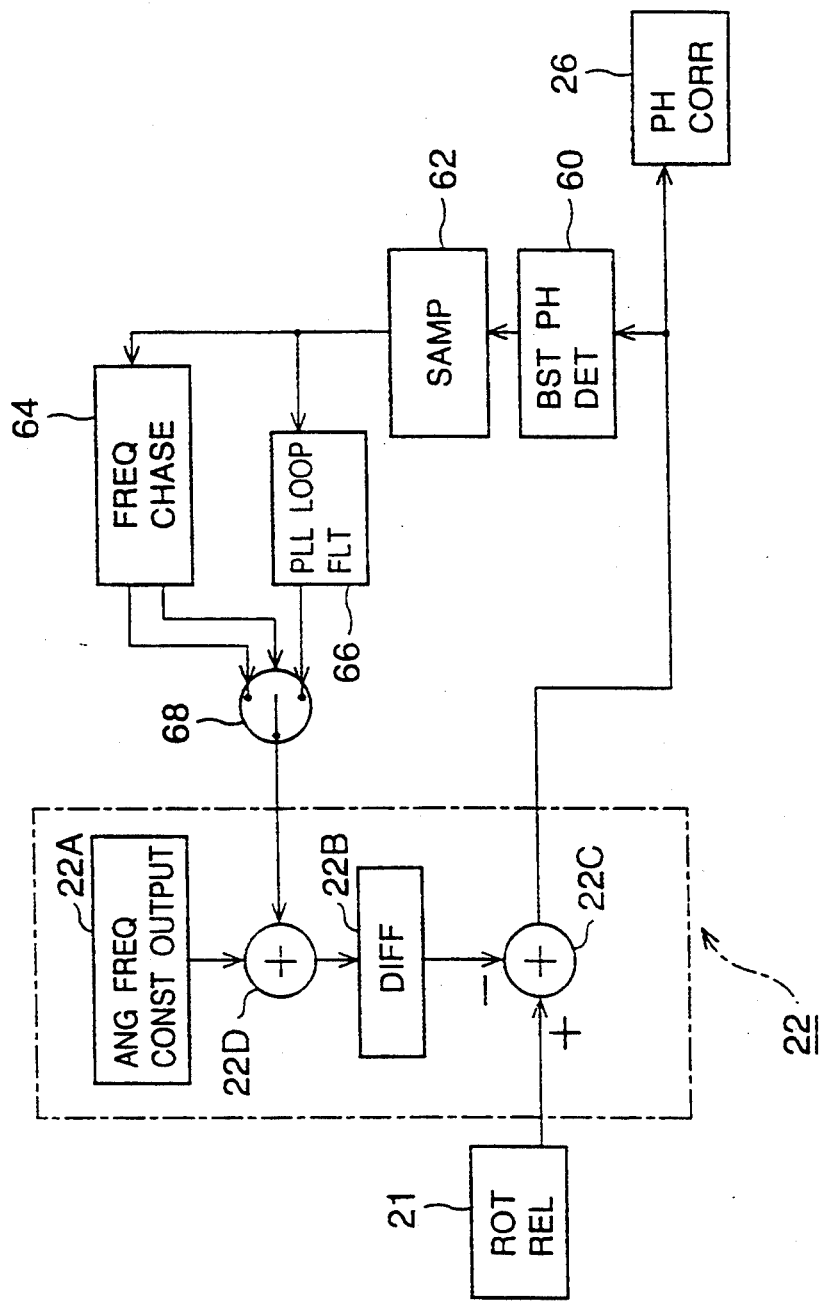
FIG. 14 is a block diagram showing another example of the frequency correcting circuit.

(2) The frequency correction can be made by the feedback loop construction as shown in FIG. 14. In FIG. 14, the burst phase detected by a burst phase detecting circuit 60 is supplied to a sampling circuit 62 for the N-point addition sampling. The sampled burst component phase data is supplied to a frequency chasing circuit 64 for detecting a large offset of the frequency or the phase and correcting the offset frequency or phase, and further to a PLL loop filter 66 for controlling the response frequency. Further, the outputs of the frequency chasing circuit 64 and the PLL loop filter 66 are selected by a switch 68 changed over on the basis of the output of the frequency chasing circuit 64. The selected output is supplied to an adder 22D of the decode circuit 22. Here, the angular frequency constant outputted by the angular frequency constant circuit 22A is corrected for correction of the frequency of the phase data.

Further, as described above, since the minimum variable frequency can be determined on the basis of the number of bits of the angular frequency constant, in this example it is necessary to represent the angular frequency constant by about 20 bits. In this case, if $f_{SMP}=f_{SC}$, the quantization error after 1H is $(360/2^{20}) \times 910 = 0.31$ degrees, which lies within a detection limit. After integrated by an integrating circuit 22B, the number of bits is limited beginning from the MSB (the most significant bit) according to the bit number (10 bits in this embodiment) of the input phase data.

(3) The practical and exemplary circuit configuration of the embodiment can be modified so as to function in the same way.

(4) In the above-mentioned embodiment, the present invention has been explained by taking the case when applied to a VTR of the VHS system. Without being limited only thereto, it is of course possible to apply the present invention to another VTR of other systems. The same can be applied to the television systems; that is, the present invention can be applied to the other various systems such as PAL, SECAM (sequential couleur a Memoire), etc. as well as the NTSC system. In this case, however, it is necessary to modify the phase rotation, the phase rotation release, the burst-up and burst-down processing, for instance where necessary.

(5) In the above-mentioned embodiment, it is apparent that the adders and subtracters can be replaced with the subtracters and the adders, respectively when the signs of the supplied signals are inverted. Therefore, the adders or the subtracters are selected appropriately in relation to the signals.

(6) In the above-mentioned embodiment, in the processing circuits from the ROT releasing circuit 21 to the encode circuit 28 or from the decode circuit 22 to the ROT circuit 56, since the computing elements such as adders or subtracters are used without use of any multipliers which inevitably increase the bit number, it is possible to consider these processing circuits as a linear coupling. Therefore, the order of the respective circuits can be changed in these circuits, and further the functions of these circuits can be integrated.

For instance, the addition of the phase data for each one horizontal scanning period effected by the ROT release circuit 21 can be integrated with the addition of the phase data for each clock effected by the decode circuit 22 and the encode circuit 28. In this case, predetermined phase data are added or subtracted for each clock.

Figure 15:
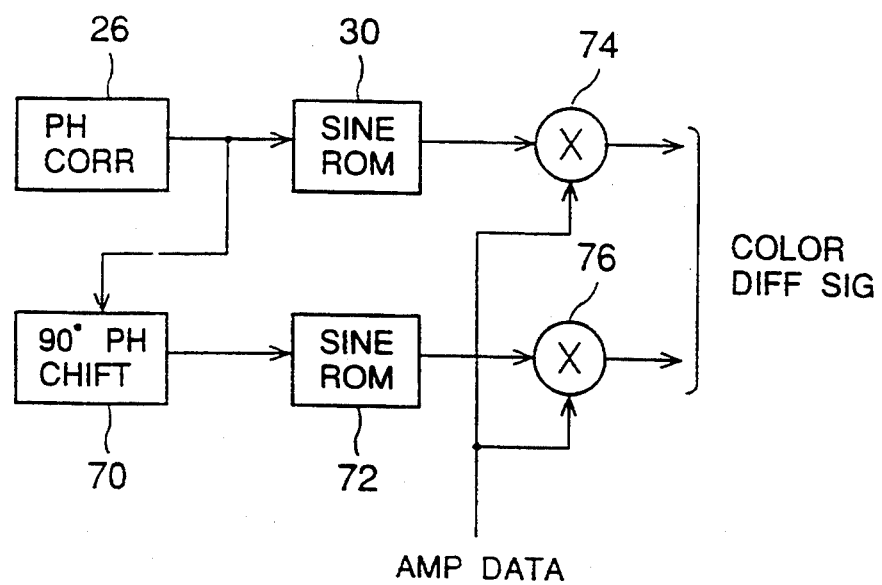
FIG. 15 is a block diagram showing an essential portion of another embodiment according to the present invention.

(7) In the case where the above-mentioned embodiment is applied to a camera-body type VTR provided with an electronic view finder, it is necessary to supply two color difference signals (R-Y, B-Y) shifted by 90 degrees from each other to the electronic view finder. In another embodiment of the present invention, the encode circuit 28 of the reproducing circuit shown in FIG. 2 is replaced with a circuit as shown in FIG. 15. In this embodiment, as shown in FIG. 15, the encode circuit 28 for converting the frequency into a high frequency band of 3.58 MHz is omitted, and the output data of the phase correcting circuit 26 is directly supplied to the sine ROM 30. Further, the output data of the phase correcting circuit 26 is supplied to the phase shift circuit 70 to obtain data for 90-degree phase shift. After that, phase-shifted data is supplied to the sine ROM 72. Further, the output signals of both the sine ROMs 30 and 72 are supplied to the multipliers 74 and 76, respectively for multiplication by the amplitude data. By the above-mentioned operation, it is possible to obtain two color difference signals from the multipliers 74 and 76, respectively.

As described above, the digital chrominance signal processing circuit according to the present invention provides the following effects:

(1) Since the phase and amplitude of the chrominance signal are separated from each other and since the decode, encode, frequency and phase correction are executed by addition and subtraction of the separated phase component, it is possible to reduce the number of elements for constructing the circuits, with the result that an excellent chrominance signal processing can be realized in spite of a small scale and a low cost circuit configuration. In addition, the hue and the color density can be both controlled simply.

(2) Since the phase and amplitude of the chrominance signal are separated from each other, since the decode, encode, frequency and phase correction are executed by addition and subtraction of the separated phase component, and further since the color difference signal can be obtained by the phase shift, it is possible to reduce the number of elements for constructing the circuits, with the result that an excellent chrominance signal processing can be realized in spite of a small scale and a low cost circuit configuration. In addition, the hue and the color density can be both controlled simply.

What is claimed is:

1. A digital chrominance signal processing circuit for converting a low-band converted chrominance signal into digital signals for reproducing processing and outputting a high-band converted chrominance signal, which comprises:
   separating means for separating a digitized chrominance signal into phase data and amplitude data;
   decoding means for decoding the phase data;
   correcting means for correcting fluctuations in frequency and in phase of the decoded phase data;
   encoding means for encoding the fluctuation-corrected phase data, an angular frequency component corresponding to a high-band converted frequency being added to or subtracted from the fluctuation-corrected phase data, thus outputting encoded phase data;

continuous wave generating means for generating a continuous wave on the basis of the encoded phase data; and multiplying means for multiplying the generated continuous wave by amplitude data to obtain high-band converted chrominance signal.

2. A digital chrominance signal processing circuit for converting a high-band converted chrominance signal into digital signals for recording processing and outputting a low-band converted chrominance signal, which comprises:

separating means for separating digitized chrominance signal into phase data and amplitude data;

decoding means for decoding the phase data;

correcting means for correcting fluctuations in frequency and in phase of the decoded phase data;

encoding means for encoding the fluctuation-corrected phase data;

control means for controlling the frequency of the encoded phase data to a predetermined frequency;

continuous wave generating means for generating a continuous wave on the basis of the frequency-controlled phase data; and multiplying means for multiplying the generated continuous wave by amplitude data to obtain a low-band converted chrominance signal.

3. A digital chrominance signal processing circuit for converting a low-band converted chrominance signal into digital signals for reproducing processing and outputting two color difference signals whose phase are shifted by 90 degrees from each other, which comprises:

separating means for separating digitized chrominance signal into phase data and amplitude data;

decoding means for decoding the phase data;

correcting means for correcting fluctuations in frequency and in phase of the decoded phase data;

first continuous wave generating means for generating a first continuous wave on the basis of the corrected phase data;

phase shifting means for shifting the phase of the corrected phase data by 90 degrees;

second continuous wave generating means for generating a second continuous wave on the basis of the phase-shifted phase data; and multiplying means for multiplying the two generated continuous waves generated by said first and second continuous wave generating means by amplitude data, respectively to obtain two color difference signals.

4. The digital chrominance signal processing circuit of claim 1, wherein said separating means comprises detecting means for detecting the phase data by obtaining two orthogonal components of the digitalized chrominance signal and by dividing the smaller component thereof by the larger component thereof.

5. The digital chrominance signal processing circuit of claim 2, wherein said separating means comprises detecting means for detecting the phase data by obtaining two orthogonal components of the digitalized chrominance signal and by dividing the smaller component thereof by the larger component thereof.

6. The digital chrominance signal processing circuit of claim 3, wherein said separating means comprises detecting means for detecting the phase data by obtaining two orthogonal components of the digitalized chrominance signal and by dividing the smaller component thereof by the larger component thereof.

7. The digital chrominance signal processing circuit of claim 1, wherein said decoding means comprises outputting means for adding or subtracting an angular frequency component corresponding to the low-band converted frequency to or from the phase data and outputting the decoded phase data.

8. The digital chrominance signal processing circuit of claim 2, wherein said decoding means comprises outputting means for adding or subtracting an angular frequency component corresponding to the high-band converted frequency to or from the phase data and outputting the decoded phase data.

9. The digital chrominance signal processing circuit of claim 3, wherein said decoding means comprises outputting means for adding or subtracting an angular frequency component corresponding to the low-band converted frequency to or from the phase data and outputting the decoded phase data.

10. The digital chrominance signal processing circuit of claim 1, wherein said correcting means comprises:

first detecting means for detecting a burst portion of the decoded phase data;

second detecting means for detecting frequency fluctuations of the burst portion;

first outputting means for outputting a correction rate corresponding to the detected frequency fluctuations; and second outputting means for adding or subtracting the outputted correction rate to or from the decoded phase data and outputting the frequency-corrected phase data.

11. The digital chrominance signal processing circuit of claim 2, wherein said correcting means comprises:

first detecting means for detecting a burst portion of the decoded phase data;

second detecting means for detecting frequency fluctuations of the burst portion;

first outputting means for outputting a correction rate corresponding to the detected frequency fluctuations; and second outputting means for adding or subtracting the outputted correction rate to or from the decoded phase data and outputting the frequency-corrected phase data.

12. The digital chrominance signal processing circuit of claim 3, wherein said correcting means comprises:

first detecting means for detecting a burst portion of the decoded phase data;

second detecting means for detecting frequency fluctuations of the burst portion;

first outputting means for outputting a correction rate corresponding to the detected frequency fluctuations; and second outputting means for adding or subtracting the outputted correction rate to or from the decoded phase data and outputting the frequency-corrected phase data.

13. The digital chrominance signal processing circuit of claim 10, wherein said correcting means comprises:

detecting means for detecting a burst phase of the frequency-corrected phase data; and third outputting means for correcting phase fluctuations of the frequency-corrected phase data in such a way that the detected phase becomes zero for each horizontal scanning period, and outputting the frequency-corrected phase data.

14. The digital chrominance signal processing circuit of claim 11, wherein said correcting means comprises:
    detecting means for detecting burst phase of the frequency-corrected phase data; and
    third outputting means for correcting phase fluctuations of the frequency-corrected phase data in such a way that the detected phase becomes zero for each horizontal scanning period, and outputting the frequency-corrected phase data.

15. The digital chrominance signal processing circuit of claim 12, wherein said correcting means comprises:
    detecting means for detecting burst phase of the frequency-corrected phase data; and
    third outputting means for correcting phase fluctuations of the frequency-corrected phase data in such a way that the detected phase becomes zero for each horizontal scanning period, and outputting the frequency-corrected phase data.

16. The digital chrominance signal processing circuit of claim 2, wherein said encoding means comprises outputting means for adding or subtracting an angular frequency component corresponding to the low-band converted frequency to or from the fluctuation-corrected phase data and outputting the encoded phase data.

17. The digital chrominance signal processing circuit of claim 2, wherein said control means comprises:
    detecting means for detecting an angular frequency component phase corresponding to the low-band converted frequency on the basis of a horizontal synchronizing signal; and
    outputting means fop adding or subtracting the detected phase data to or from the encoded phase data and outputting the phase data whose frequency is controlled to a predetermined frequency.

* * * * *